United States Patent Office 3,595,849
Patented July 27, 1971

3,595,849
POLYMERIZATION CATALYST OF α-OLEFINS
Senji Nakano, Masamitsu Murayama, and Toshinobu Watanabe, Tokyo, and Takehisa Okawa, Kawasaki-shi, Japan, assignors to Mitsubishi Chemical Industries Ltd., Tokyo, Japan
No Drawing. Filed Feb. 29, 1968, Ser. No. 709,235
Claims priority, application Japan, Mar. 9, 1967, 42/14,429; Aug. 7, 1967, 42/50,297; Sept. 18, 1967, 42/59,410
Int. Cl. C08f *1/56, 3/10*
U.S. Cl. 260—93.7    16 Claims

ABSTRACT OF THE DISCLOSURE

An improved polymerization catalyst for α-olefins formed by mixing a halide of a transition metal having a lower valency than the maximum valency, an organoaluminum compound, and an ion exchange resin.

---

This invention relates to the polymerization of α-olefins, and particularly to polymerization catalysts which favor the formation of isotactic polymers.

It has been well-known that α-olefins are polymerized into crystalline polymers by a catalyst comprising titanium trichloride and trialkyl aluminum or dialkyl aluminum monohalide, and that the catalyst loses its catalytic activities when the organoaluminum component is replaced by a monoalkyl aluminum dihalide or alkyl aluminum sesquihalide.

It has been found that a new catalyst for polymerization of α-olefins is produced when an ion exchange resin is combined with a halide of a transition metal having a lower valency than the maximum valency and an organoaluminum compound. The new catalyst has the advantages that the polymerization rate is increased considerably in comparison with the two-component catalyst consisting of a transition metal halide and an organoaluminum compound, and that the crystallinity or isotacticity of the polymer produced by employing the catalyst is high enough for the commercial production thereof.

The transition metal halide may be a halide of a metal of Groups IV, V and VI of the Periodic Table, among which especially titanium, vanadium, chromium and molybdenum are preferred.

The metal of such compounds must have a valency lower than the maximum valency, since the transition metal halide wherein the metal has the maximum valency cannot form an active catalyst.

Suitable transition metal halides are titanium trihalides, such as titanium trichloride, titanium tribromide and titanium triiodide. Titanium trichloride is conveniently produced by reducing titanium tetrachloride with a metal or an organometallic compound. It is preferred that titanium tetrachloride be reduced by metallic aluminum to form a complex of $3TiCl_3 \cdot AlCl_3$, the so-called δ-modification of titanium trichloride. However, titanium trichloride which is produced by any other process and has an appropriate crystalline structure may be employed with satisfactory results.

The organoaluminum compound is shown by the general formula:

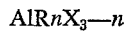

wherein R is an alkyl group having 1 to 12 carbon atoms, X is halogen having an atomic weight of at least 35, such as chlorine, bromine and iodine, and $n$ is a number between 1 and 2. The organoaluminum compound may be methyl aluminum dichloride, methyl aluminum sesquichloride, dimethyl aluminum monochloride, ethyl aluminum dichloride, ethyl aluminum sesquichloride, diethyl aluminum monochloride, butyl aluminum dichloride, and butyl aluminum sesquichloride, dibutyl aluminum monochloride, dihexyl aluminum monochloride, dioctyl aluminum monochloride, didodecyl aluminum monochloride and the like, and the bromides and iodides corresponding to the above-mentioned chlorides or a mixture of these compounds can be employed.

Suitable ion exchange resins include strongly acid and weakly acid cation exchange resins, such as sulfonic acid type resins and carboxylic acid type resins, which can be in either the hydrogen form or the salt form such as Na and K form; and strongly basic and weakly basic anion exchange resins, such as amine type resins and quaternary ammonium type resins, which can be in either the hydroxide form or the salt form such as Cl form. The use of anion exchange resins is preferred.

In order to attain an increased polymerization rate and close contact of the catalyst components it is preferred to employ a porous ion exchange resin or to grind commercial ion exchange resin particles, however resin particles may be employed without grinding to obtain a sufficient polymerization rate.

The anion exchange resin is preferably treated with an organic acid anion, such as carboxylate, sulfonate or sulfinate anions. The compounds containing such organic acid anions may be aliphatic carboxylic acids, such as formic acid, acetic acid, propionic acid, malonic acid and succinic acid; aromatic carboxylic acids, such as benzoic acid; halogenated aliphatic carboxylic acids, such as monochloroacetic acid, dichloroacetic acid, trichloroacetic acid, monoiodoacetic acid and diiodoacetic acid; aliphatic sulfonic acids, such as methane sulfonic acid and ethane sulfonic acid; aromatic sulfonic acids, such as benzene sulfonic acid and toluene sulfonic acid; aliphatic sulfinic acids, such as methane sulfinic acid and ethane sulfinic acid; aromatic sulfinic acids, such as benzene sulfinic acid; and water soluble salts, especially alkali metal salts of these acids.

In a preferred treatment, these organic acid anion containing compounds are dissolved in water or other suitable solvent and passed through a bed of the anion exchange resin in the hydroxide form obtained by contacting commercially available anion exchange resin in the salt form with aqueous sodium hydroxide.

When treating strongly basic anion exchange resins, such as quaternary ammonium type resins, the salts of the organic acids may be used as well as free acids. However, weakly basic resins, such as amine type resins cannot be treated with the salts, since such resins are not basic enough to decompose neutral salts.

In accordance with this invention, the catalyst is prepared by mixing the abovementioned components, and the presence of water and oxygen should be avoided. Ion exchange resins are ordinarily somewhat hygroscopic and contain a small amount of water, especially when the resins are subjected to pre-treatment with organic acid anions. Accordingly, it is recommended to dry the resins at an elevated temperature, for example, at 60 to 70° C. for 3 hours under vacuum.

The proportion of the catalyst components may be varied over a wide range. It has been found that a suitable range is from 0.2 to 20 moles, preferably from 0.3 to 10 moles of the organoaluminum compound per one mole of transition metal halide and from 10 to 100,000 milliequivalents, preferably from 50 to 5,000 milliequivalents, as total exchange capacity, of the resin per mole of the organoaluminum compound.

Usually, the catalyst components are mixed in a solvent at room temperature in any order. Any inert, normally liquid solvent may be employed in the preparation of the catalyst. A preferred solvent is the aliphatic, cycloaliphatic or aromatic hydrocarbon which is to be employed in the polymerization of the α-olefins. For example, hexane, heptane, octane, cyclohexane, benzene and toluene are recommended. An olefin monomer may also be employed as the solvent, when the organoaluminum compound and ion exchange resin are being admixed in the absence of the transition metal halide.

At the same time or after the mixing, the catalyst components are preferably heated in an inert gas atmosphere and usually in the solvent. For this purpose it is enough to subject to the heat treatment the organoaluminum compound and the ion exchange resin. In such case, the organoaluminum compound and the ion exchange resin are mixed with the solvent and heated in an inert gas before the transition metal halide is added to the mixture. Of course, all three components of the catalyst may be subjected to the heat treatment together.

The heat treatment is carried out above room temperature, preferably at a temperature from 40° C. to 150° C. and especially from 60° C. to 100° C. for over 10 minutes, preferably from 30 minutes to 5 hours and especially to 2 hours. Of course, heating time and temperature are related and the conditions are properly selected within such ranges.

The inert gas may be argon, helium and nitrogen from which oxygen should be removed since the catalyst components are oxidized to decompose the catalyst.

The catalyst thus prepared is effective for polymerization of α-olefins, such as ethylene, propylene and butene-1. The polymerization conditions employed can be those of the conventional process. The temperature is usually from 0° to 150° C., preferably from room temperature to 100° C. and the pressure is from atmospheric to superatmospheric pressure of about 100 kg./cm.$^2$. The polymerization may be carried uot in the absence of solvent. However, it is preferred to employ such solvent as aforementioned. Hydrogen can be employed for controlling the molecular weight and other properties of the resulting polymers.

Upon the completion of the polymerization reaction, a conventional catalyst decomposing reagent such as an alcohol or acid-alcohol mixture is added to the reaction mixture, whereby some of the decomposed metal components are adsorbed by the ion exchange resin, which results in easier removal of the metal components by washing later. The solid phase containing the polymer and the ion exchange resin is separated from the liquid phase and washed with water, alcohol, a mixture thereof, or the like. Then the polymer is recovered by suitable means, for example by decantation utilizing the difference in densities. The ion exchange resin thus separated from the polymer is easily regenerated by an appropriate treatment and it can be used again for the preparation of the catalyst. The reuse of such component is a novel feature which has not been accomplished in the prior art techniques.

The olefin polymers obtained by this invention are highly crystalline polymers of high molecular weights which are suitable for injection and extrusion molding films and fibers.

The invention will be illustrated by means of examples however it should be understood that these are given merely for explanation and are not intended to restrict the scope of this invention.

In the following examples, reduced viscosity ($\eta$) $SP/C$ is measured in Tetralin at 135° C. at a concentration of polymer of 0.1% by weight, n-heptane insolubility shows percent by weight of the polymer which remains insoluble after extraction in boiling n-heptane for six hours in a Soxhlet extractor, and the titanium trichloride employed is the AA grade (TiCl$_3$·⅓AlCl$_3$) from Stauffer Chemical Co., U.S.A.

EXAMPLE 1

Into a 500 ml. flask previously purged with argon gas and equipped with a thermometer, reflux condenser and stirrer was charged 250 ml. of n-heptane, 1.0 g. of chloride form porous quaternary ammonium type anion exchange resin (Amberlite IRA 904 available from Rohm and Haas Company, U.S.A.), which has 3.66 meq./g. of exchange capacity, 5.0 millimoles of ethyl aluminum sesquichloride and 5.0 millimoles of titanium trichloride.

Then propylene was introduced into the flask and polymerized at a temperature of 70° C. for 4 hours, while maintaining atmospheric pressure by the continued addition of monomer.

Then the reaction was terminated by adding isopropanol containing hydrogen chloride to the polymerization system, whereby the metal compounds in the catalyst were decomposed and the product was diluted and washed. Then the solid portion was separated by filtration and dispersed in water-ethanol solution. Upon standing the dispersion was clearly divided into a lower layer of the ion exchange resin precipitated and an upper layer of the polypropylene, which was separated by decantation and dried at 60° C.

38.8 g. of white polypropylene powder having an n-heptane insolubility of 92.7% and a reduced viscosity of 2.31 was obtained.

EXAMPLE 2

The same procedures as in Example 1 were repeated except that 2.0 g. of the chloride form of a porous quaternary ammonium anion exchange resin (Amberlite IRA 904) was used, and the polymerization time was 2 hours.

The polypropylene so produced was 36.8 g. of white powder, the n-heptane insolubility was 86.6% and the reduced viscosity was 2.58.

EXAMPLE 3

The same procedures as in Example 1 where repeated except that 0.6 g. of the chloride form porous quaternary ammonium anion exchange resin (Amberlite IRA 904) and diethyl aluminum monochloride were charged and polymerization time was 2 hours.

The polypropylene so produced was 31.5 g. of white powder, the n-heptane insolubility was 89.5% and the reduced viscosity was 2.43.

EXAMPLE 4

Into a 500 ml. flask equipped with thermometer, reflux condenser and stirrer and purged with argon gas was charged 250 ml. of n-heptane, 2.0 g. of chloride form tertiary amine anion exchange resin (Amberlite IRA 93) having 5.46 meq./g. of exchange capacity 5.0 millimoles of ethyl aluminum sesquichloride and 5.0 millimoles of titanium trichloride. Then, propylene was introduced at 70° C., and the polymerization was carried out at that temperature for 4 hours under atmospheric pressure by the continued addition of monomer.

Upon completion of the reaction, the reaction product was worked up as in Example 1. 42.5 g. of white pulverulent polypropylene having an n-heptane insolubility of 92.5% and a reduced viscosity of 2.41 was obtained.

For comparative purposes, the same conditions were employed except that there was no ion exchange resin and the reaction time was 2 hours. Only a trace of polymer was produced.

EXAMPLE 5

Into a 500 ml. autoclave previously purged with argon gas was charged 250 ml. of n-heptane, 1.0 g. of sodium form carboxylic cation exchange resin (Amberlite IRC 50) having 10.2 meq./g. of exchange capacity, 5.0 millimoles of ethyl aluminum sesquichloride and 5.0 millimoles of titanium trichloride. Then propylene was introduced until a pressure of 10 kg./cm.$^2$ was reached, and the polymerization was carried out at 70° C. for 2 hours maintaining such pressure by introducing additional propylene.

Upon completion of the reaction, the reaction product was worked up as in Example 1. 59.0 g. of white powder polypropylene having an n-heptane insolubility of 93.6% and a reduced viscosity of 1.75 g. was produced.

EXAMPLE 6

Into a 500 ml. flask equipped with thermometer, reflux condenser and stirrer and purged with argon gas was charged 250 ml. of n-heptane, 1.0 g. of chloride form tertiary amine anion exchange resin (Amberlite IRA 93) having 5.46 meq./g. of exchange capacity, 5.0 millimoles of monoethyl aluminum dichloride and 5.0 millimoles of titanium trichloride. Propylene was introduced and the polymerization was carried out under 1 atm. of propylene pressure at 70° C. for 2 hours. The resulting product was worked up as in Example 1.

The polypropylene so obtained was 13.3 g. of white powder, 89.3% insoluble in n-heptane and with a reduced viscosity of 1.73.

EXAMPLE 7

Into a 500 ml. autoclave purged with argon gas was charged 250 ml. of n-heptane, 1.0 g. of chloride form quarternary ammonium anion exchange resin (Amberlite IRA 900) having 4.15 meq./g. of exchange capacity, 5 millimoles of monoethyl aluminum dichloride and 5 millimoles of titanium trichloride. Then propylene was introduced until 10 kg./cm.$^2$ of propylene pressure and a temperature at 70° C. was reached. The polymerization was carried out at that temperature for 2 hours and the work-up as in Example 1.

31.1 g. of white polypropylene powder 87.4% insoluble in n-heptane and having a reduced viscosity of 1.65 was obtained.

EXAMPLE 8

The procedures described in Example 1 were repeated, except that an anion exchange resin in the OH form (Amberlite IRA 904) was employed.

The product was 15.2 g. of white polypropylene powder having 90.2% n-heptane insolubility and a reduced viscosity of 2.12.

EXAMPLE 9

1.0 g. of Na form sulfonic cation exchange resin (Amberlite IRC 200) having 4.60 meq./g. of exchange capacity was employed and other procedures were the same as in Example 1.

The polypropylene so produced was 13.1 g. of white powder, 89.1% n-heptane insolubility and having a reduced viscosity of 2.38.

EXAMPLE 10

20 ml. of porous quaternary ammonium salt type strong basic anion exchange resin (Amberlite IRA 904) having 3.66 meq./g. of exchange capacity was put into a glass cylinder equipped with a glass filter. 400 ml. of 1 N NaOH and then 4000 ml. of desalted water were passed through the resin at a rate of 200 ml./hr. to convert the anion exchange resin into its hydroxide form. Subsequently, the resin was treated with 400 ml. of 1 N acetic acid solution at a rate of 200 ml./hr., completely washed with a large amount of desalted water and dried at 70° C. for 4 hours under vacuum. The ion exchange resin so treated was employed as a catalyst component.

A 500 ml. flask equipped with thermometer, reflux condenser and stirrer was filled with argon gas, then 250 ml. of n-heptane, 1.0 g. of anion exchange resin prepared as above-mentioned, 5.0 millimoles of ethyl aluminum sesquichloride and 5.0 millimoles of titanium trichloride were charged. By introducing propylene at 70° C. and maintaining 1 atm. of propylene pressure, the polymerization was carried out for 4 hours, whereupon ethanol containing hydrogen chloride was added to terminate the reaction by decomposition of the metal compounds in the catalyst system. The solid matter was separated by filtration and suspended in water-methanol solution. The polypropylene was separated from the precipitated ion exchange resin by decantation and dried at 60° C.

65.3 g. of white polypropylene powder, 86.0% insoluble in n-heptane and having a reduced viscosity of 2.55 was obtained.

Titanium tribromide was substituted for the titanium trichloride, and the same result was obtained.

EXAMPLE 11

200 ml. of tertiary amine type weak basic anion exchange resin (Amberlite IRA 93) having 5.46 meq./g. of exchange capacity was put into a cylinder equipped with a glass filter. The resin was treated sequentially with 400 ml. of 1 N hydrochloric acid at 200 ml./hr., 400 ml. of 1 N NaOH solution at 200 ml./hr. 400 ml. desalted water at 200 ml./hr., 2,000 ml. of 0.1 N acetic acid at 400 ml./hr. and 1 ml. of absolute methanol at 4 ml./hr., and dried at 7° C. for 4 hours under vacuum.

Except that 1 g. of the anion exchange resin so obtained and 2 hours polymerization time were employed, the same procedure as in Example 9 were repeated.

The polypropylene so produced was 3.8 g. of white powder, 89.5% insoluble in n-heptane and with a reduced viscosity of 2.66.

For comparative purposes, the Cl form of the anion exchange resin which was not treated with acetic acid was employed. The resulting polypropylene weighed 13.3 g.; it was 89.3% insoluble in n-heptane and had a reduced viscosity of 1.73.

EXAMPLE 12

The Amberlite IRA 904 was treated with benzenesulfonic anion solution in place of acetic acid solution as in Example 10.

The polymerization was carried out for two hours in accordance with the procedure in Example 10 except that 5.0 millimole of diethyl aluminum monochloride and 1.0 g. of anion exchange resin prepared as above-mentioned were employed.

The polypropylene so obtained was 36.8 g. of white powder, 89.0% insoluble in n-heptane and having a reduced viscosity of 2.33.

EXAMPLES 13–19

The strong basic ion exchange resin employed in Example 9 was charged with various anions, and the same procedures were repeated. The results are listed in Table 1.

TABLE 1

| Example | Anion in organic acid | Yield (g.) | n-Heptane, insoluble | Reduced viscosity |
|---|---|---|---|---|
| 13 | H·COO- | 55.4 | 90.7 | 2.70 |
| 14 | C$_2$H$_5$COO- | 65.4 | 91.4 | 2.83 |
| 15 | CH$_2$ClCOO- | 34.6 | 91.6 | 2.66 |
| 16 | CH$_2$ICOO- | 25.4 | 91.4 | 2.35 |
| 17 | 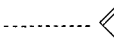—SO$_3$- | 47.0 | 93.0 | 2.69 |
| 18 | 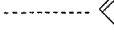—SO$_2$- | 49.5 | 91.3 | 2.44 |
| 19 | CH$_2$(COO-)$_2$ | 14.1 | 88.0 | 1.96 |

EXAMPLE 20

Except that the anion exchange resin was treated with formic acid anion was and ethyl aluminum dichloride were employed, the same procedures as in Example 10 were repeated. 9.8 g. of white polypropylene powder, 90.5% insoluble in n-heptane and having a reduced viscosity of 2.38 was obtained.

EXAMPLE 21

250 ml. of n-heptane, 1.0 g. of Cl form, strongly basic anion exchange resin (Amberlite IRA 904) having 3.66 meq./g. of exchange capacity and 5 millimoles of ethyl aluminum sesquichloride were charged into a 500 ml. flask equipped with thermometer, reflux condenser and stirrer which was previously filled with argon gas. The contents of the flasks were then heat treated at 70° C. for 30 minutes with agitation. Immediately after the treatment 5.0 millimoles of titanium trichloride was added and propylene was introduced to carry a polymerization reaction for 4 hours during which a temperature of 70° C. and a pressure of propylene of 1 atm. were maintained. Then the catalyst was decomposed by addition of ethanol containing hydrogen chloride, and polypropylene was recovered and dried as mentioned in Example 1.

The polypropylene so obtained was 57.6 g. of white powder, 89.5% insoluble in n-heptane and having a reduced viscosity of 2.72.

EXAMPLE 22

250 ml. of n-heptane, 1.0 g. of Cl form, weakly basic anion exchange resin (Amberlite IRA 93) having 5.46 meq./g. and 5.0 millimoles of ethyl aluminum sesquichloride were charged into a flask as in Example 21, and the mixture was heat treated at 70° C. for one hour in an argon gas atmosphere. Thereafter 5.0 millimoles of titanium trichloride was added and propylene was introduced to start polymerization. The reaction was continued at 70° C. for 2 hours maintaining 1 atm. of propylene pressure.

The polypropylene so obtained weighed 19.0 g., was 92.0% insoluble in n-heptane and having a reduced viscosity of 1.73.

EXAMPLES 23–27

Employing the flask used in Example 21, 250 ml. of heptane, 1.0 g. of Cl form, strongly basic anion exchange resin (Amberlite IRA 904) having 3.66 meq./g. of exchange capacity and 5.0 millimoles of ethyl aluminum sesquichloride were heat treated in an argon gas atmosphere under the conditions listed in Table 2. Then 5.0 millimoles of titanium trichloride was added and propylene was introduced. The polymerization carried out at 70° C. for 4 hours.

TABLE 2

| Example | Heat treatment, temperature (° C.) | Time (hr.) | Yield (g.) | n-Heptane insoluble (percent) | Reduced viscosity |
|---|---|---|---|---|---|
| Control | | | 38.8 | 92.7 | 2.31 |
| 23 | 60 | 2 | 43.0 | 92.0 | 2.84 |
| 24 | 70 | 1 | 52.0 | 91.3 | 2.74 |
| 25 | 70 | 2 | 75.0 | 89.8 | 2.87 |
| 26 | 70 | 5 | 64.6 | 89.9 | 2.81 |
| 27 | 80 | 2 | 85.8 | 86.8 | 3.00 |

EXAMPLE 28

Into the same size flask as employed in Example 21 was charged 250 ml. of n-heptane, 1.0 g. of Cl form anion exchange resin (Amberlite IRA 904) having 3.66 meq./g. of exchange capacity, 5.0 millimoles of ethyl aluminum sesquichloride and 5.0 millimoles of titanium trichloride, and heated at 80° C. for 2 hours in an argon atmosphere. Immediately after the heat treatment propylene was introduced and the polymerization was carried out at 80° C. for 4 hours.

The resulting polypropylene weighed 57.0 g., was 78.0% insoluble in n-heptane and had a reduced viscosity of 1.76.

EXAMPLES 29–34

The procedures in Example 27 were repeated but heat treatment conditions were according to those in Table 3.

TABLE 3

| Example | Heat treatment, temperature (° C.) | Time (hr.) | Yield (g.) | n-Heptane insoluble (percent) | Reduced viscosity |
|---|---|---|---|---|---|
| 29 | 70 | 0.5 | 49.3 | 92.7 | 2.86 |
| 30 | 70 | 1.0 | 42.1 | 91.3 | 2.82 |
| 31 | 70 | 2.0 | 53.7 | 91.4 | 3.17 |
| 32 | 70 | 4.0 | 64.0 | 88.8 | 3.27 |
| 33 | 80 | 0.5 | 55.2 | 91.0 | 2.79 |
| 34 | 80 | 1.0 | 64.2 | 88.0 | 3.25 |

EXAMPLE 35

The heat treatment for catalyst components as in Example 28 was repeated and the mixture was cooled to 60° C. Then the polymerization of propylene was carried out at that temperature.

The resulting polypropylene weighed 55 g., 94.5% of the polymer was insoluble in n-heptane and it had a reduced viscosity of 5.10.

EXAMPLE 36

The procedures as in Example 28 were repeated except that heat treatment and polymerization were at 70° C. and OH form Amberlite IRA 904 was employed.

The resulting polypropylene weighed 61.5 g., 90.8% was insoluble in n-heptane and had a reduced viscosity of 2.56.

EXAMPLE 37

Except that 5 millimoles of ethyl aluminum dichloride was employed, the procedures in Example 19 were repeated.

The polypropylene thus obtained was 13.2 g. of white powder, 90.0% insoluble in n-heptane and had a reduced viscosity of 2.42.

What is claimed is:

1. A polymerization catalyst for α-olefins which essentially consists of the product formed by reacting a titanium halide, an alkyl aluminum halide, and an ion exchange resin selected from the group consisting of amine type anion exchange resins in the salt form, quaternary ammonium type anion exchange resin, carboxylic acid type cation exchange resins and sulfonic acid type cation exchange resins in an inert, normally liquid solvent selected from the group consisting of aliphatic, cycloaliphatic and aromatic hydrocarbons under anhydrous conditions and in the absence of oxygen, (a) the valence of said titanium in said titanium halide being less than four,
    (b) the alkyl of said alkyl aluminum halide having up to twelve carbon atoms,
    (c) the halogen in said halides having an atomic weight of at least 35,
    (d) the mole ratio of said titanium halide to said alkyl aluminum halide being between 1:0.2 and 1:20, and
    (e) the amount of said ion exchange resin being between 10 and 100,000 milliequivalents, as total exchange capacity, per mole of said alkyl aluminum halide.

2. A catalyst as set forth in claim 1, wherein said ion exchange resin is an anion exchange resin.

3. A catalyst as set forth in claim 2, wherein said anion exchange resin is of the quaternary ammonium type.

4. A catalyst as set forth in claim 1, wherein said ion exchange resin is a cation exchange resin.

5. A catalyst as set forth in claim 4, wherein said cation exchange resin is of the sulfonic acid type.

6. A catalyst as set forth in claim 4, wherein said cation exchange resin is of the carboxylic acid type.

7. A method of preparing a polymerization catalyst for α-olefins which comprises mixing a titanium halide, an alkyl aluminum halide, and an ion exchange resin selected from the group consisting of an amine type anion exchange resin the salt form, a quaternary ammonium type anion exchange resin, a carboxylic acid type cation exchange resin and a sulfonic acid type cation exchange resin under anhydrous conditions and in the absence of oxygen, (a) the valence of said titanium in said titanium halide being less than four,
    (b) the alkyl of said alkyl aluminum halide having up to twelve carbon atoms,
    (c) the halogen in said halides having an atomic weight of at least 35,
    (d) the mole ratio of said titanium chloride to said alkyl aluminum halide being between 1:0.2 and 1:20, and (e) the amount of said ion exchange resin being between 10 and 100,000 milliequivalents, as total exchange capacity, per mole of said alkyl aluminum halide.

8. A method as set forth in claim 7, wherein said alkyl aluminum halide and said ion exchange resin are jointly heated at 40° C. to 150° C. for 10 minutes to 5 hours.

9. A method as set forth in claim 8, wherein said titanium halide is added to said alkyl aluminum halide and said ion exchange resin after the joint heating of said alkyl aluminum halide and said ion exchange resin.

10. A method as set forth in claim 8, wherein said alkyl aluminum halide and said ion exchange resin are heated jointly for 30 minutes to 2 hours at 60° C. to 100° C.

11. A method as set forth in claim 10, wherein said alkyl aluminum halide and said ion exchange resin are mixed with an inert solvent prior ot said heating, and said titanium halide is added to the resulting mixture after said heating, said inert solvent being an aliphatic, cycloaliphatic, or aromatic hydrocarbon.

12. A method as set forth in claim 7, wherein said ion exchange resin is an anion exchange resin, and is contacted, prior to said mixing, with anions of an organic acid selected from the group consisting of carboxylic, sulfonic, and sulfinic acids.

13. A method as set forth in claim 12, wherein said organic acid is a sulfonic or a sulfinic acid.

14. A method as set forth in claim 12, wherein said ion exchange resin is contacted with an aqueous solution of said organic acid or of a salt thereof.

15. In a method of polymerizing an α-olefin in the presence of a catalyst consisting of the reaction product of a titanium halide and an alkyl aluminum halide, the improvement which comprises contacting said α-olefin under polymerization conditions with a catalyst prepared by the method of claim 7.

16. In a method of polymerizing propylene in the presence of a catalyst containing a titanium halide and an alkyl aluminum halide, the improvement which comprises contacting said propylene under polymerization conditions with a catalyst prepared by the method of claim 7.

References Cited

UNITED STATES PATENTS

| | | | |
|---|---|---|---|
| 3,277,069 | 10/1966 | Natta et al. | 260—93.7 |
| 3,483,274 | 12/1969 | Bacskai | 260—878 |
| 3,489,699 | 1/1970 | Battaerd et al. | 260—2.1 |
| 2,846,427 | 8/1958 | Findlay | 260—94.9 |
| 3,081,291 | 3/1963 | Richmond | 260—94.9 |

FOREIGN PATENTS

| | | |
|---|---|---|
| 1,001,820 | 8/1965 | Great Britain. |
| 737,044 | 6/1966 | Canada. |

JOSEPH L. SCHOFER, Primary Examiner

E. J. SMITH, Assistant Examiner

U.S. Cl. X.R.

252—429; 260—94.9